United States Patent
Kovlakas et al.

[11] Patent Number: 5,974,307
[45] Date of Patent: Oct. 26, 1999

[54] METHOD AND SYSTEM COMMUNICATING WITH A VOICE RESPONSE UNIT OVER A CELLULAR TELEPHONE NETWORK

[75] Inventors: Steve Kovlakas, Norwalk, Conn.; Steven Vasquez, Kings Park, N.Y.; Jean-Hiram Coffy, Norwalk; Michael Wilson, Trumbull, both of Conn.

[73] Assignee: Pitney Bowes Inc., Stamford, Conn.

[21] Appl. No.: 08/577,683

[22] Filed: Dec. 21, 1995

[51] Int. Cl.⁶ ........................................... H04Q 7/22
[52] U.S. Cl. ............................ 455/405; 455/331; 371/32
[58] Field of Search ..................... 455/405, 406, 455/407, 408, 412, 424, 425, 560, 63; 379/112, 114, 130, 131, 140, 91.02, 144; 370/445, 356

[56] References Cited

U.S. PATENT DOCUMENTS

| | | |
|---|---|---|
| 3,255,439 | 6/1966 | Simjian . |
| 3,428,948 | 2/1969 | Simjian . |
| 3,501,744 | 3/1970 | Simjian . |
| 3,716,698 | 2/1973 | Simjian . |
| 3,792,446 | 2/1974 | McFiggins et al. . |
| 3,890,599 | 6/1975 | Simjian . |
| 3,977,222 | 8/1976 | Luperti et al. . |
| 3,998,079 | 12/1976 | Uthenwoldt . |
| 4,097,923 | 6/1978 | Eckert, Jr. et al. . |
| 4,122,532 | 10/1978 | Dlugos et al. . |
| 4,138,735 | 2/1979 | Allocca et al. . |
| 4,218,011 | 8/1980 | Simjian . |
| 4,222,518 | 9/1980 | Simjian . |
| 4,226,360 | 10/1980 | Simjian . |
| 4,249,071 | 2/1981 | Simjian . |
| 4,258,252 | 3/1981 | Simjian . |
| 4,268,817 | 5/1981 | Simjian . |
| 4,317,028 | 2/1982 | Simjian . |
| 4,376,299 | 3/1983 | Rivest . |
| 4,436,992 | 3/1984 | Simjian . |
| 4,447,890 | 5/1984 | Duwel et al. . |
| 4,787,045 | 11/1988 | Storace et al. . |
| 4,811,234 | 3/1989 | Storace . |

(List continued on next page.)

*Primary Examiner*—William Cumming
*Attorney, Agent, or Firm*—Ronald Reichman; Melvin J. Scolnick

[57] ABSTRACT

This invention overcomes the disadvantages of the prior art by providing a voice response unit that communicates rapidly and directly with a metered cellular telephone network with minimum human intervention. The rapid communication is achieved by knowing the question or prompt posed by the voice response unit and preparing a response which is speed dialed to the voice response unit. The voice response unit also calculates a check sum to determine if there is an error in the information transmitted to the voice response unit. The check sum may be the total of the absolute value of the request code, account number, serial number, access code and amount desired to be added to the cellular phone divided by ten. If, the check sum calculated by the voice response unit is not divisible by ten, the voice response unit knows that the information it received is incorrect. Then, the voice response unit would ask for the information it received to be retransmitted at a different rate of speed.

13 Claims, 3 Drawing Sheets

U.S. PATENT DOCUMENTS

| | | |
|---|---|---|
| 4,812,992 | 3/1989 | Storace . |
| 4,827,508 | 5/1989 | Shear . |
| 4,841,527 | 6/1989 | Raychaudhuri et al. . |
| 4,864,506 | 9/1989 | Storace . |
| 4,965,821 | 10/1990 | Bishop et al. . |
| 4,977,594 | 12/1990 | Shear . |
| 5,010,571 | 4/1991 | Katznelson . |
| 5,050,213 | 9/1991 | Shear . |
| 5,051,564 | 9/1991 | Schmidt . |
| 5,058,025 | 10/1991 | Haines et al. . |
| 5,077,660 | 12/1991 | Haines . |
| 5,136,648 | 8/1992 | Olson et al. . |
| 5,138,650 | 8/1992 | Stahl et al. ............................... 379/61 |
| 5,224,046 | 6/1993 | Kim et al. . |
| 5,233,531 | 8/1993 | Schulz . |
| 5,237,506 | 8/1993 | Horbal et al. . |
| 5,239,294 | 8/1993 | Flanders et al. . |
| 5,243,654 | 9/1993 | Hunter . |
| 5,247,575 | 9/1993 | Sprague et al. . |
| 5,282,250 | 1/1994 | Dent et al. . |
| 5,291,543 | 3/1994 | Freese et al. . |
| 5,301,223 | 4/1994 | Amadon et al. . |
| 5,301,234 | 4/1994 | Mazziotto et al. . |
| 5,309,363 | 5/1994 | Graves et al. . |
| 5,309,501 | 5/1994 | Kozik et al. . |
| 5,319,705 | 6/1994 | Halter et al. . |
| 5,325,418 | 6/1994 | McGregor et al. . |
| 5,329,573 | 7/1994 | Chang et al. . |
| 5,335,278 | 8/1994 | Matchett et al. . |
| 5,359,182 | 10/1994 | Schilling . |
| 5,369,401 | 11/1994 | Haines . |
| 5,377,264 | 12/1994 | Lee et al. . |
| 5,377,267 | 12/1994 | Suzuki et al. . |
| 5,377,268 | 12/1994 | Hunter . |
| 5,388,148 | 2/1995 | Seiderman . |
| 5,394,469 | 2/1995 | Nagel et al. . |
| 5,509,050 | 4/1996 | Berland . |
| 5,673,306 | 9/1997 | Amadon et al. . |
| 5,677,945 | 10/1997 | Mullins et al. . |
| 5,682,421 | 10/1997 | Glovitz et al. . |
| 5,684,861 | 11/1997 | Lewis et al. . |

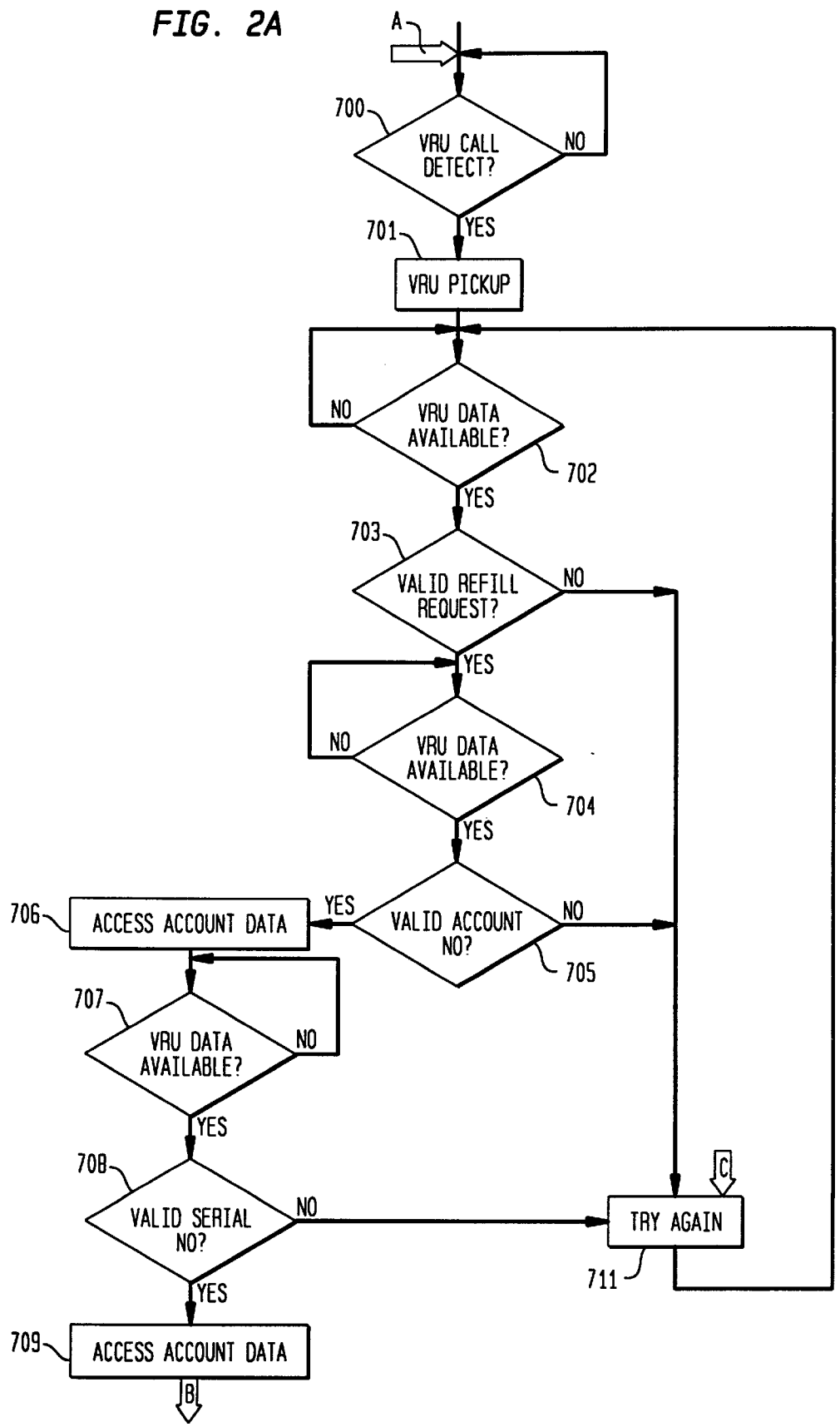

METHOD AND SYSTEM COMMUNICATING WITH A VOICE RESPONSE UNIT OVER A CELLULAR TELEPHONE NETWORK

CROSS REFERENCE TO RELATED APPLICATIONS

Reference is made to commonly assigned copending patent application Ser. No. 08/577,789 filed herewith entitled "Authorized Cellular Telephone Communication Access And Verification Control System" in the names of Anthony F. Violante and Ronald P. Sansone and Ser. No. 08/577,567 filed herewith entitled "Authorized Cellular Voice Messaging And/Or Analog or Digital Data Communication Access And Verification Control System" in the names of Ronald P. Sansone and Anthony F. Violante; Ser. No. 08/577,361 filed herewith entitled "Cellular telephone Manifest System" in the names of Ronald P. Sansone and Anthony F. Violante; and Ser. No. 08/575,782 filed herewith entitled "Metered Payment Cellular Telephone Communication System" in the names of Gary G. Hansen, David W. Riley, David K. Lee, Frederick W. Ryan, Jr. Nathan Rosenberg, Anthony F. Violante and Ronald P. Sansone.

FIELD OF THE INVENTION

The invention relates generally to the field of telecommunications systems and more particularly to voice response units that communicate directly with cellular telephones with minimum human intervention.

BACKGROUND OF THE INVENTION

Voice response units have been developed for generating an acoustic speech signal that communicates an intended message to permit a machine response to a human request for information. The units have been used to automate the process of entering or exchanging information with a system. Thus, voice response units permit natural interactions between a human and a system. The foregoing can be valuable for announcing warnings, reporting machine status or otherwise informing the system user, especially when the human can not view displays, due to concurrent visual tasks, visual handicap, or remote telephone link.

Often incorrect information is transmitted to voice response units and entered into the system (as valid data) that is coupled to the voice response unit. The incorrect information may result from: incorrectly typed human input information; information that was not heard or understood by the human; or information that was not correctly understood by the voice response unit due to noise on the communications link.

If, a voice response unit was used in a cellular telephone network, the foregoing problem would be exacerbated by the distance between the cellular telephone and the voice response unit, interference on the cellular network and too many phone calls being made on the cellular network.

Another problem of the prior art is that manual entry of data into a voice response unit is relatively slow and annoying to impatient people.

SUMMARY OF THE INVENTION

This invention overcomes the disadvantages of the prior art by providing a voice response unit that communicates rapidly and directly with a system with minimum human intervention. The rapid communication is achieved by knowing the question or prompt posed by the voice response unit and preparing a response which is speed dialed to the voice response unit.

The voice response unit also calculates a check sum to determine if there is an error in the information transmitted to the voice response unit. The check sum may be the total of the absolute value of the request code, account number, serial number, access code and amount desired to be added to the cellular phone divided by ten. If, the check sum calculated by the voice response unit is not divisible by ten, the voice response unit knows that the information it received is incorrect. Then, the voice response unit would ask for the information it received to be retransmitted at a different rate of speed.

The apparatus of this invention may be used in a cellular telephone payment metering system to enable the rapid, reliable interchange of information between a cellular telephone and a data center to enable funds to be added to the cellular telephone.

BRIEF DESCRIPTION OF THE DRAWING

FIGS. 2A and 2B are a flow chart of the interaction of computer 511 with voice response unit 499.

DETAILED DESCRIPTION OF THE PREFERRED EMBODIMENT

Figure 1:
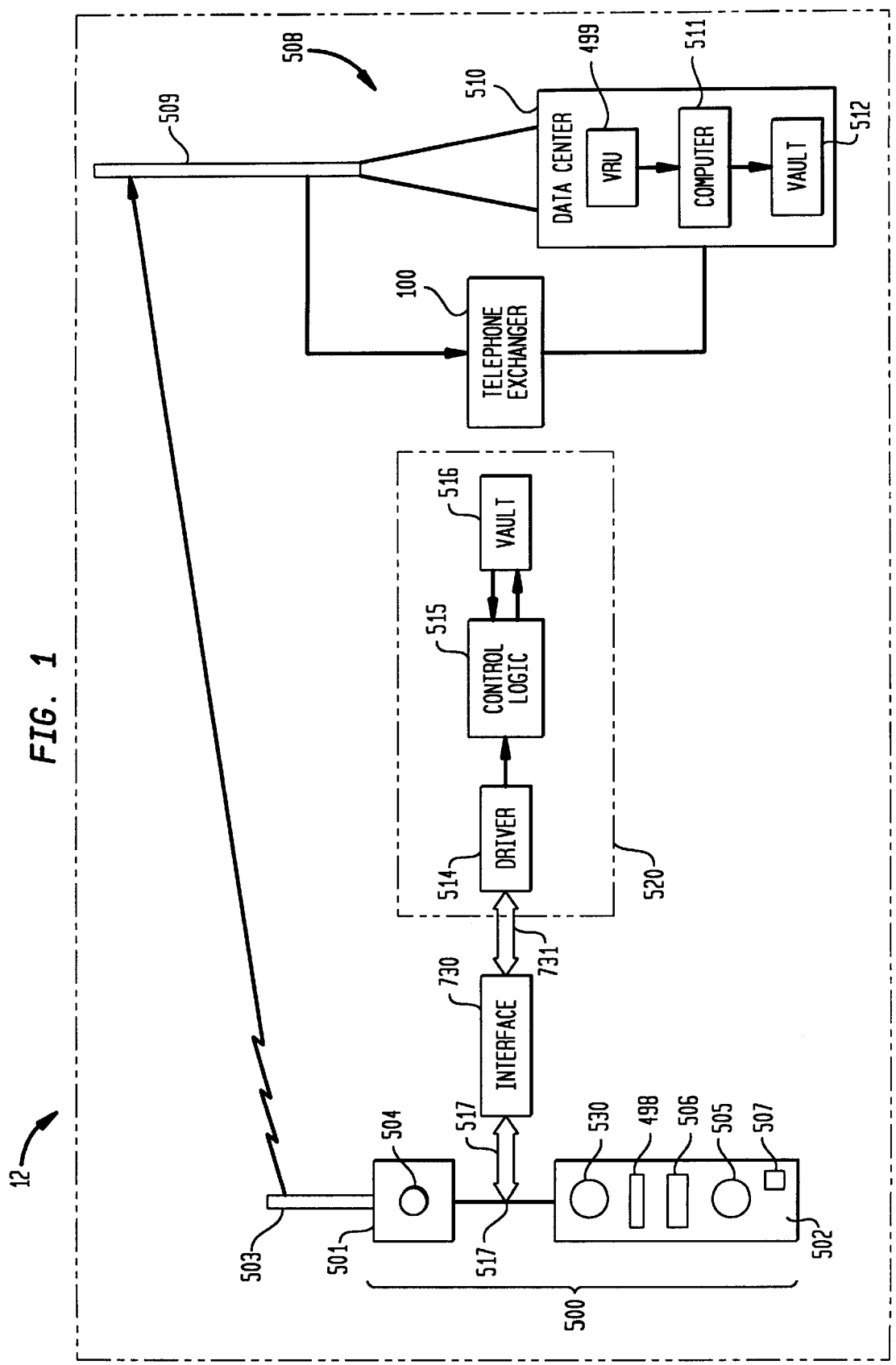
FIG. 1 is a drawing of the cellular telecommunications network of this invention.

Referring now to the drawings in detail and more particularly to FIG. 1, the reference character 12 represents the cellular telecommunications network of this invention. Network 12 includes: a cellular telephone 500, that has a radio portion 501 and a handset portion 502; a base station 508, that includes an antenna 509 and a data center 510 that includes a voice response unit 499, a computer 511 and a vault 512; and a telephone exchange 100. Radio 501 has an antenna 503 and speaker 504. Handset portion 502 has a mouthpiece 505, a keypad 506, a display 498, a speaker 530 and a power switch 507. Radio portion 501 is connected to handset portion 502 by a plurality of bi-directional wires 517. Wires 517 are connected to the input of interface 730 and wires 731 are coupled from the output of interface 730 to the input of driver 514. Interface 730 acts as a handshake to make the signals on wires 517 compatible with the signals processed by microprocessor 520. Driver 514 is coupled to control logic 515 and control logic 515 is connected to vault 516.

Driver 514 is a computer program that resides in microprocessor 520. Driver 514 decodes the information that is entered into handset portion 502 via keypad 506 and transforms the entered information into a 16 bit command word. It would be obvious to one skilled in the art that different numbers of bits may be used for the command word depending upon the amount of information that is being conveyed. The operation of driver 514 will be more fully described in the description of copending U.S. patent application Ser. No. 08/575,782 entitled "Metered Payment Cellular Telephone Communication System".

Control logic 515 is a computer program that resides in microprocessor 520. Logic 515 takes action on the items it monitors and controls the management of funds entered into vault 516. Control logic 515 uses the information provided by driver 514 for call and vault management. Call management pertains to: deciding what telephone numbers are dialed; preventing the completion of telephone calls when there is not sufficient funds in vault 516; and the allowing of certain "free" emergency calls. Vault management refers to: decrementing vault 516 on a time and rate basics during a telephone call; initiating an algorithm contained in voice response unit (VRU) 499 during the vault refill process; and displaying the remaining funds contained in vault 516. The operation of control logic 515 will be more fully described in the description of copending U.S. patent application Ser. No. 08/575,782 entitled "Metered Payment Cellular Telephone Communication System".

A plurality of recorded messages are stored in VRU 499. Computer 511 determines which recorded message would be transmitted to the caller that is using cellular telephone 500. The cellular telephone caller responds to the recorded message by pressing one or more of the buttons on keypad 506. The messages are transmitted to VRU 499 from cellular telephone 500 in the form of dual tone modulated frequency (DTMF) tones. The DTMF tone corresponding to a # button on keypad 506 is used by the cellular telephone caller to signify the end of a message. VRU 499 converts the DTMF tones into numbers that computer 511 can read and then transmits these numbers to computer 511. Computer 511 will then inform VRU 499 the appropriated recorded message or response. The interaction of computer 511 with VRU 499 will be more fully described in the description of FIGS. 2A and 2B.

Vaults 512 and 516 contain registers and information needed to track the use of cellular telephone 500. Vaults 512 and 516 contain: ascending registers; descending registers; a control sum (which is the sum of the ascending and descending registers); and encryption logic (which is in the form of a program code). Vault 516 uses seeds that are embedded into vault 516 at the time of the vaults manufacture. The seeds in vault 516 are in plain text. Vault 512 uses seeds that are encoded and are decoded in vault 512 prior to the seeds being used for encryption. The new seeds generated by vault 512 must then be encrypted before they are returned to computer 511. The aforementioned seeds are used to insure that the information contained in vault 512 matches the information contained in vault 516. The currently used seed will also be used to generate new seeds for vaults 512 and 516 for the next refill. The operation of vaults 512 and 516 will be more fully described in the description of copending U.S. patent application Ser. No. 08/575,782 entitled "Metered Payment Cellular Telephone Communication System".

When someone would want to place a telephone call on telecommunications network 12, they would activate power switch 507 and enter the telephone number they wish to call on keypad 506. Driver 514 and control logic 515 will process the call and cellular telephone 500 will transmit a signal via antenna 503. The aforementioned signal is received by antenna 509 and connected to telephone exchange 100.

Figure 2B:
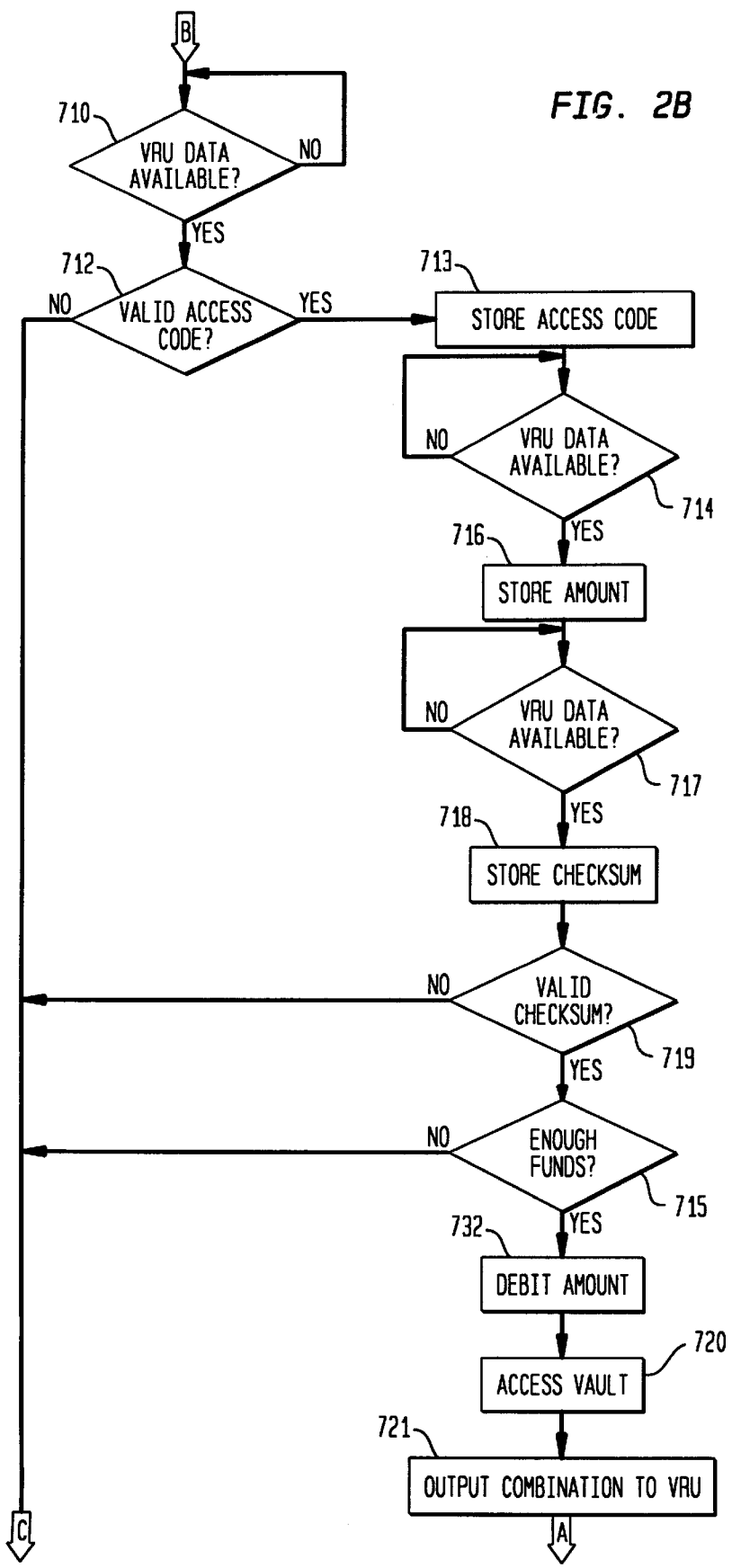

FIGS. 2A and 2B are a flow chart illustrating the interaction of computer 511 with voice response unit 499. The program begins at VRU call detect block 700. If, no data is being transmitted from cellular telephone 500 by the depressing of one or more buttons on keypad 506, the program would remain in block 700 waiting for a call. If, a call occurs, the program would proceed to VRU pickup block 701, where VRU 499 would answer the call being transmitted by cellular telephone 500. VRU 499 would also output a welcome message together with a prompt to the caller. The prompt may ask the caller to press one or more buttons on keypad 506, to enter a code and/or to press one or more buttons on keypad 506 to continue. Then, cellular telephone 500 will automatically begin sending information as expected to VRU 499.

The program now proceeds to VRU data available block 702. If, data is not available from cellular telephone 500, the program will wait in block 702. If, data is available the program would advance to valid refill request block 703. In this block the program determines whether or not a refill request was received. If, a refill request was received, the program advances to VRU data available block 704. If, the data is not currently available, the program waits in block 704. If the data is currently available the program goes to valid account number block 705, where computer 511 determines if the entered account number transmitted by cellular telephone 500 is valid.

If, the account number is valid, the program proceeds to access account data block 706. In block 706 computer 511 obtains information regarding the account. After, receiving the information the program advances to VRU data available block 707. If, no account data is available, the program waits in block 707. If, the data is currently available, the program proceeds to valid serial number block 708. If, a valid serial number was automatically transmitted by cellular telephone 500, the program advances to access account data block 709. In block 709 computer 511 obtains information regarding the use of cellular telephone 500. Then, the program would proceed to VRU data available block 710 (FIG. 2B).

If, a valid refill request was not received in block 703, or a valid account number was received in block 705 or a valid serial number received in block 708, the program would advance to try again block 711. In block 711, computer 511 would instruct VRU 499 to transmit a message to cellular telephone 500 requesting the caller of cellular telephone 500 to press a button on keypad 506 to retry entering a refill. Cellular telephone 500 would then use refill Method B described in FIG. 3F of copending U.S. patent application Ser. No. 08/575,785 entitled "Metered Payment Cellular Telephone Communication System" to transmit information to VRU 499 from cellular telephone 500.

After, the correct buttons were pressed on keypad 506, the program would go to VRU data available block 710. If, no data is received by VRU 499, the program would wait in block 710 until data is available. When data is available the program would go to valid access code block 712. If, a valid access code was received the program would go to store access code block 713, where the access code would be stored for future use. Then, the program would advance to VRU data available block 714. If, no data is currently available, the program will wait in block 714 until data is available from cellular telephone 500 via VRU 499. If, data is available, the program would go to store amount block 716, where the amount previously entered in block 610 of FIG. 3D of copending U.S. patent application Ser. No. 08/575,782 entitled "Metered Payment Cellular Telephone Communication System" will be transmitted to VRU 499 and computer 511.

After, the amount has been stored the program advances to VRU data available block 717. If, the checksum is available, the program goes to store checksum block 718, where the checksum is stored. Now, the program goes to valid checksum block 719, where a checksum is calculated in order to compare the calculated checksum to the stored checksum. The calculation of the checksum is the value needed to raise the sum of the digits in blocks 703, 706, 708, 713 and 716, to the next value divisible by 10.

If, the calculated checksum is equal to the stored checksum, the program goes to enough funds block 715, where computer 511 checks to determine if there is sufficient credit or funds available to debit the entered amount against the account. If, sufficient funds are available, the program proceeds to debit amount block 732, where the amount debited is stored. Then, the program goes to access vault block 720, where the program gives the hidden seed, the amount, the access code and the control sum to vault 512 and receives a new hidden seed, a new control sum and the combination. Now, the program goes to block 721 and outputs the combination to VRU 499.

If, a valid access code was not received in block 712, not enough funds were available in block 715 or a invalid check sum in block 719, the program would go to try again block 711 (FIG. 2A). It is possible at any point in the above program for the caller to hang up and try refilling cellular telephone 500 at a different time. Now, the program would go to block 700 in FIG. 2A.

The above specification describes a new and improved cellular telecommunications systems that utilizes a voice response unit that communicates directly with cellular telephones with minimum human intervention. It is realized that the above description may indicate to those skilled in the art additional ways in which the principles of this invention may be used without departing from the spirit. It is, therefore, intended that this invention be limited only by the scope of the appended claims.

What is claimed is:

1. A system for metering cellular telephone usage and connecting one or more cellular telephones to a telephone network, said system comprising:

a plurality of cellular telephones having a first processor having a program that resides therein that contains information that represents funds or call units that have been placed in said first processor so that the funds or call units are removed from said first processor when calls are made and added to said first processor when funds are added;

a telephone exchange that is coupled to a data center having a second processor having a program that resides therein that represents funds or call units that have been placed in or removed from said first processor, so that said cellular telephones are connected to the network if sufficient funds are present in said first processor and are not connected to the network if sufficient funds are not present in the first processor;

a voice response unit containing a plurality of prerecorded prompts or questions to enable a user to add funds to said first processor, said unit is located in the data center;

means located in the cellular telephone responsive to said voice unit for the user to enter information requested by said voice unit and the amount of additional funds or call units the user wants to be added;

means located in the cellular telephone for calculating a check sum;

means located in the cellular telephone for using a seed to encrypt the check sum;

means located in the data center for calculating a check sum; and means located in the data center using the seed to encrypt the check sum;

means located in the data center for requesting the values of the components that comprise the encrypted check sum to be transmitted at a slower rate, if the encrypted check sum calculated by the data center does not equal the encrypted check sum transmitted by the cellular telephone.

2. The system claimed in claim 1, further including:

means located in said enter means for rapidly entering information.

3. The system claimed in claim 1, wherein said telephone means for calculating a check sum comprises:

means for determining the value of a request code;

means for determining the value of a account number;

means for determining the value of a serial number;

means for determining the value of a access code;

means for determining the value of a amount of funds or call units desired to be added to the cellular telephone;

means for summing the values of the request code, the account number, the serial number, the access code and the amount of funds or units to be added; and means for transmitting the values of the request code, the account number, the serial number, the access code, the amount of funds or units to be added and the check sum to the data center.

4. The system claimed in claim 3, further including:

means for dividing the output of said summing means by ten.

5. The system claimed in claim 3, wherein said data center means for calculating a checksum comprises:

means for determining the value of the request code;

means for determining the value of the account number;

means for determining the value of the serial number;

means for determining the value of the access code;

means for determining the value of the amount of funds or call units desired to be added to the cellular telephone; and means for summing the values of the request code, the account number, the serial number, the access code and the amount of funds or units to be added.

6. The system claimed in claim 5, further including:

means for dividing the output of said summing means by ten.

7. The system claimed in claim 6, further including:

means for comparing the output of said telephone means for calculating a checksum and said data center means for calculating a checksum.

8. A system for communicating with a metered cellular telephone that connects one or more cellular telephones to a telephone network and includes a plurality of cellular telephones that contained information that represents funds or call units that have been placed in the cellular telephone and a telephone exchange that is coupled to a data center that contains information that represents funds or units that have been placed in or removed from the cellular telephone, said system comprises:

a voice response unit located in the data center, said unit contains a plurality of prerecorded prompts or questions to enable the user to add funds or units to the cellular telephone and the data center.

means located in the cellular telephone responsive to said voice unit for the user to enter information requested by said voice unit and the amount of additional funds or call units the user wants to be added;

means located in said enter means for rapidly entering information;

means for calculating a check sum to determine if there is an error in the information transmitted to said voice response unit;

means located in the cellular telephone for calculating a check sum;

means located in the cellular telephone for using a seed to encrypt the check sum;

means located in the data center for calculating a check sum;

means located in the data center for using a seed to encrypt the check sum; and means located in the data center for requesting the values of the components that comprise the encrypted check sum to be transmitted at a slower rate if the encrypted check sum calculated by the data center does not equal the encrypted check sum transmitted by the cellular telephone.

9. The system claimed in claim 8, wherein said telephone means for calculating a check sum comprises:

means for determining the value of a request code;

means for determining the value of a account number;

means for determining the value of a serial number;

means for determining the value of a access code;

means for determining the values of a amount of funds or call units desired to be added to the cellular telephone;

means for summing the values of the request code, the account number, the serial number, the access code and the amount of funds or units to be added; and means for transmitting the values of the request code, the account number, the serial number, the access code, the amount of funds or units to be added and the check sum to the data center.

10. The system claimed in claim 9, further including:

means for dividing the output of said summing means by ten.

11. The system claimed in claim 9, wherein said data center means for calculating a checksum comprises:

means for determining the value of the request code;

means for determining the value of the account number;

means for determining the value of the serial number;

means for determining the value of the access code;

means for determining the value of the amount of funds or call units desired to be added to the cellular telephone; and means for summing the value of the request code, the account number, the serial number, the access code and the amount of funds or units to be added.

12. The system claimed in claim 11, further including:

means for dividing the output of said summing means by ten.

13. The system claimed in claim 12, further including:

means for comparing the output of said telephone means for calculating a checksum and said data center means for calculating a checksum.

\* \* \* \* \*